United States Patent Office 2,873,201
Patented Feb. 10, 1959

2,873,201

LINOLEUM COMPOSITION AND PROCESS OF MAKING IT

Lawrence H. Dunlap and John A. Parker, Lancaster Township, Lancaster County, Pa., assignors to Armstrong Cork Company, Lancaster, Pa., a corporation of Pennsylvania No Drawing. Application February 28, 1955
Serial No. 491,182

12 Claims. (Cl. 106—228)

This invention relates generally to linoleum compositions and more particularly to linoleum compositions containing a particular linoleum cement. Still more particularly this invention relates to linoleum compositions containing a cement binder which is the reaction product of dimerized fatty acids and pentaerythritol and which possesses certain characteristics.

Linoleum compositions containing fillers, pigments, and a linoleum cement have been prepared over a great many years. The linoleum cement in common usage is that prepared from a drying oil and a resin by any number of methods. The end result of these methods, however, is the production of an oleoresinous siccative oil-resin gel by oxidizing and polymerizing the drying oil generally in the presence of the resin. Such oleoresinous cements generally comprise about 65% to about 85% drying oil and about 35% to about 15% resin. For many years these linoleum cements were manufactured from a resin such as rosin and a siccative oil such as a drying oil, for example, linseed oil, or a semidrying oil, for example, soya bean oil. In recent years, however, other materials have been proposed for use in place of a portion or all of the oleoresinous components of the known linoleum cements. Much research has been carried out in attempts to produce linoleum compositions wherein the linoleum cement is of such nature that enhanced properties of the linoleum composition may be obtained.

Although a great many polyesters and alkyd and modified alkyd resins have been developed and exploited, very few if any of these resinous materials are suitable for linoleum manufacture. This has been true because of the peculiar requirements of linoleum compositions. Such compositions must exhibit unusual properties of alkali resistance, indentation, residual indentation, water absorption, stiffness, anl abrasion resistance. Many of these physical properties are such that when one is enhanced another is decreased. For example, it is difficult to obtain a linoleum composition which possesses at the same time good flexibility and low residual indentation. It is also difficult to produce a linoleum composition which possesses at the same time high alkali resistance and high flexibility. And lurking behind these stringent requirements is the all-encompassing need to keep cost down if linoleum is to continue to be sold on the vast scale which it enjoys today.

It is, therefore, the primary object of the present invention to produce a linoleum composition possessing enhanced physical properties with regard to at least some of the necessary characteristics while maintaining the other characterisics at a suitable level.

This object is accomplished in a surprisingly effective manner. A linoleum composition is prepared containing 55-80% by weight fillers and pigments, the balance comprising a linoleum cement. The linoleum cement is attained by reacting at elevated temperatures dimerized fatty acid with pentaerythritol. The respective amounts of the dimerized acids and pentaerythritol are such that initially the hydroxyl groups in the pentaerythritol are present in slight excess over the carboxyl groups in the dimerized acids. The reaction between the dimerized acids and pentaerythritol must be terminated at an acid number between about 65–90. Subsequently fillers and pigments are incorporated into the reaction product of the dimerized acids and the pentaerythritol, and the composition after being sheeted or placed in other suitable form is air cured at a temperature in the range of about 170°–210° F.

The dimerized fatty acids utilized by the present invention are a known item of commerce. They are prepared by the thermal polymerization of drying oils carried out in a pressure vessel in the presence of water (steam). Such compositions contain on the average about 3% monomer, 85% dimer, and 12% trimer. The iodine value is approximately 90, and the acid number is in the neighborhood of about 190. The product is essentially a 36-carbon dibasic acid obtained by dimerization of the linoleic acid of soya, cotton seed, corn, and linseed oils of commerce. The product is frequently referred to as dilinoleic acid. It may be purchased under the name "Empol 1022."

The pentaerythritol too is a known item of commerce. Although pure pentaerythritol may be utilized in the present invention, the technical grades containing minor amounts of other polyols are perfectly suitable. Use of the pure material allows a shortening of the curing time of the linoleum composition and produces a slightly harder product.

The reaction between the dimerized fatty acid and the pentaerythritol is preferably carried out in an alkyd resin reactor with or without the presence of an esterification catalyst such as zinc chloride. The dimerized acid may be charged to the kettle and heated to an elevated temperature with stirring, after which the pentaerythritol may be added slowly so as not to reduce the temperature unduly. Alternatively, the dimerized acid and the pentaerythritol may both be charged in the cold and the mixture brought up to reaction temperature.

The reaction temperature should be in the range of about 150°–185° C., and preferably about 170° C. A flow of inert gas such as carbon dioxide or nitrogen should be maintained through the reacting mass in order to minimize oxidation of the charge.

Water will distill off once the reaction commences and should be removed from the sphere of reaction in known ways.

The relative amount of the dimerized fatty acid and the pentaerythritol should be such that initially the hydroxyl groups in the pentaerythritol are in slight excess of the carboxyl groups in the dimerized acid. On an equivalent basis about two moles of the dimerized acids should be used for about one mole of pentaerythritol, or more properly when the slight excess is taken into consideration, for about every 1.1 moles of pentaerythritol. The reactive portion of the dimerized acid contains 2 carboxyl groups per molecule while the pentaerythritol contains 4 hydroxyl groups per molecule. Thus the 2 to 1 mole ratio dimerized acid to pentaerythritol accomplishes the necessary equivalence of carboxyl groups and hydroxyl groups.

As the reaction proceeds the acid number of the reaction mixture will fall. A careful check must be maintained on the acid number, since the reaction must be terminated once the acid number falls to between about 65–90. Should the acid number fall below about 65, the mass will be either at the gellation point or very near it and will thus be rendered extremely difficult to handle, particularly during the subsequent incorporation of the other ingredients of the linoleum composition. Furthermore, poor wetting of pigments will result, and the final product will be too hard after curing. On the other hand, if the reaction is terminated at an acid number higher than about 90, the linoleum composition subsequently formed will be incapable of curing under the necessary conditions. The preferred acid number range is about 67-74.

Once the reaction has proceeded to the point where the acid number lies between the requisite 65-90, the polyester is preferably removed from the reactor. It may then be converted to a gel and admixed with the other components of the linoleum composition.

The fillers and pigments may be those materials normally used to load linoleum and may be mill mixed in at elevated temperatures, for example 240° F. Wood flour, slate flour, whiting, and asbestos, along with pigments such as titanium dioxide and other known pigments, are normally used. Although pigments and fillers are present within the range of about 55%-80% by weight of the total composition, a preferably embodiment is a composition containing about 65% pigments and fillers. The pigments and fillers may simply be blended with the polyester by any of the known methods.

After compounding the polyester with the pigments and fillers, the linoleum composition may be sheeted or formed into tiles in conventional manner as by sheeting to 0.125 gauge on a two-roll mill with a temperature differential of 250°-150° F. The sheets may be formed as such, or they may be formed on a backing such as burlap duck or flooring felt or other similar material.

Subsequent to the formation of the backed or unbacked sheet or tiles of the linoleum composition, the composition must be cured. The cure is to be carried out at a temperature in the range of about 170°-210° F. The period of time of the cure will be contingent to some extent on the properties desired in the finished product. One method of determining the proper length of the period of curing is to carry the cure until the linoleum composition exhibits a percentage indentation in the range of about 30%-40%. Such indentation determinations are made by known methods, for example, by pressing a weight of 150 pounds on a point measuring 0.178 square inch for a period of 30 seconds on the linoleum composition and measuring the depth of the penetration. Generally the desired degree of cure is accomplished in a period of time ranging from about 2½ to about 4 hours, which is an exceptionally short period of cure for linoleum composition. The curing at temperatures near the lower limit of the 170°-210° range will, of course, require a longer time, while that near the upper limit of the temperature curing range will require correspondingly shorter times. If time is consumed in bringing the stove or oven up to the requisite temperature range, then the total time in the oven or stove will be correspondingly longer.

The final product will be found to be an excellent linoleum composition. The composition possesses slightly enhanced tensile strength over previous compositions while maintaining other properties at the necessary levels. But the outstanding advantage of the linoleum composition of the present invention is its resistance to alkali. The usual types of linoleum compositions leave something to be desired with regard to alkali resistance. The present composition, however, possesses sufficient alkali resistance that it may be said to be substantially inert to those alkaline conditions normally encountered in household use. The tests made on the present linoleum composition show that the composition remains unaffected by alkaline conditions which completely destroy the known linoleum compositions described earlier.

A preferred embodiment of the present invention takes advantage of a completely unexpected and surprising fact. In order to achieve extraordinary resistance to alkaline conditions, it is unnecessary that the linoleum cement consist solely of the dimer acid-pentaerythritol polyester cement described herein. If the know oleoresinous linoleum cements are replaced in part only by the polyester described herein, the resulting linoleum composition will possess extraordinary resistance to alkaline conditions as opposed to the straight oleoresinous composition.

A series of tests were made to determine the alkali resistance of loaded linoleum compositions wherein the siccative oil-rosin oleoresinous binder made up of 10% unesterified tall oil, the balance comprising oxidized linseed oil and rosin, was replaced in progressive amounts with the polyester prepared as described herein. Samples containing different amounts of the polyester were immersed for 6 hours in a 2% sodium hydroxide solution maintained at 100° F. At the end of the period, the amount of composition remaining intact was weighed. The following table illustrates the results:

TABLE

| Percent Polyester in Cement | Percent Sample Remaining |
|---|---|
| 0 | 21 |
| 2 | 50 |
| 5 | 64 |
| 10 | 78 |
| 15 | 84 |
| 20 | 84 |
| 30 | 84 |
| 40 | 87 |
| 50 | 87 |
| 60 | 95 |
| 70 | 99 |
| 80 | 99 |

As can be seen from the table, the incorporation of very small amounts of the polyester causes rapid and unexpected increases in the alkali resistance of the oleoresinous cement. By the time about 15% of the polyester has replaced a corresponding proportion of the oleoresinous binder, 84% of the sample remains after the drastic conditions of the test. Increasing the amount of the polyester beyond 15% by weight of the cement simply gives a gradually increasing resistance to alkali until at about 70% by weight of polyester the percent of the sample remaining is about 99% of the original sample. Thus 2%-70% by weight polyester causes outstanding alkali resistance. It can be seen that where the cement consists entirely of the polyester prepared as described herein, the linoleum composition made therefrom possesses alkali resistance of the very highest order while at the same time preserving those other physical properties so essential in linoleum compositions. As is evident from the table, additions of the polyester greater than about 15% by weight of the cement are generally unnecessary since the law of diminishing returns has set in. If, however, in special cases higher degrees of alkali resistance are needed, greater amounts of the polyester may be incorporated. For general usage, however, it is preferred that the amount of polyester to be used to replace the oleoresinous binder be in the range of about 2%-15% by weight.

The following examples illustrate several embodiments of the invention. All parts given are by weight unless otherwise stated.

*Example I*

Into a reactor equipped with a stirrer, thermometer, and a gas tube to allow the admission of carbon dioxide to blanket the reaction, was placed a charge of 1,323 parts dimerized acid ("Empol 1022") and 162 parts commercial pentaerythritol ("Pentek"). The charge was heated with agitation and under a $CO_2$ blanket to 170° C. and maintained at that temperature for a little over 2 hours during which time the temperature did not vary more than plus or minus 2° C.

At the end of that period, the acid number was 67 plus or minus 1.

The polyester liquid product was poured into a steam-heated mixer and mixed with 35% by weight of wood flour for ½ hour. The blend was then placed in an oven maintained at 195° F. After 5½ hours in the oven, the mix had gelled.

The gel was removed and further admixed with whiting to form a linoleum composition containing a total of 65% total fillers and pigments. This blend was sheeted to 0.125 gauge and cured for 3½ hours at 195° F. The resulting product possessed excellent physical properties as a linoleum composition in the usual floor surfacing applications.

*Example II*

A charge of 11,800 parts "Empol 1022" was placed in a reactor and heated to a temperature of 170° C. To the heated charge was added 1,441 parts "Pentek" over a period of 20 minutes. The reaction was maintained at 170° C. for an additional 1 hour and 40 minutes, at which time the acid number had fallen to 74.

The liquid polyester was poured into a steam-heated mixer maintained at 125° C. until gellation occurred. This gelled material was used to prepare the linoleum composition described in the following examples.

*Example III*

Using the polyester gel prepared as described in Example II, a series of linoleum compositions was prepared. These compositions had the following formulations:

| Sheet No. | Percent Polyester | Percent Wood Flour | Percent York Whiting |
|---|---|---|---|
| Control | 0 (37% oleoresinous binder) | 24.00 | 39.00 |
| 1 | 23.82 | 27.97 | 48.18 |
| 2 | 27.75 | 27.50 | 44.75 |
| 3 | 30.05 | 26.50 | 43.44 |

The compositions noted above were cured at 190° F. for 3 hours after having been formed into sheets on a calendar. The following physical properties were found to exist for the compositions described:

| Sheet No. | Sand Abrasion Loss, cc. | Percent Indentation | Percent Residual Indentation |
|---|---|---|---|
| Control | 1.88 | 41.7 | 15.0 |
| 1 | 1.78 | 31.6 | 7.3 |
| 2 | 1.61 | 32.5 | 5.5 |
| 3 | 1.42 | 31.3 | 5.1 |

The polyester-containing sheets showed no deterioration on being immersed in 2% NaOH solution at 100° F. for 6 hours; the oleoresinous sheet decomposed.

*Example IV*

An oleoresinous linoleum cement was substituted in varying degrees with the polyester prepared as in Example II. The oleoresinous cement contained 10% tall oil, the balance being made up of oxidized linseed oil and rosin, the entire mixture being oxidized to form a gel in accordance with known procedures.

The following table describes the physical characteristics obtained from sheeted linoleum compositions containing 37% binder and 63% fillers and pigments.

| Sheet No. | Percent Polyester in oleoresinous Binder | Percent Indentation | Percent Residual Indentation | Alkali Resistance |
|---|---|---|---|---|
| Control | 0 | 30.0 | 6.9 | Poor. |
| 1 | 20 | 29.1 | 6.6 | Excellent. |
| 2 | 35 | 25.3 | 4.7 | Do. |
| 3 | 50 | 23.9 | 4.6 | Do. |
| 4 | 65 | 25.3 | 4.3 | Do. |
| 5 | 80 | 24.7 | 4.8 | Do. |

We claim:

1. A linoleum composition containing 55%–80% by weight fillers and pigments, the balance comprising a cured linoleum cement obtained by (1) reacting at elevated temperatures dilinoleic acid with pentaerythritol in amounts such that initially the hydroxyl groups in pentaerythritol are present in slight excess over the carboxyl groups in said acid, said reaction being terminated at an acid number between about 65–90, and (2) subsequently curing said cement in the presence of said fillers and pigments at a temperature in the range of about 170°–210° F.

2. A linoleum composition according to claim 1 wherein said reaction is carried out at a temperature in the range of about 160°–185° F.

3. A linoleum composition according to claim 1 wherein said reaction is terminated at an acid number between about 67–74.

4. A linoleum composition according to claim 1 wherein said curing step is carried out at a temperature of about 190° F.

5. A linoleum composition containing about 55%–80% by weight fillers and pigments and about 45%–20% by weight linoleum cement, said linoleum cement comprising about 80%–20% by weight of an oleoresinous siccative oil-resin gel comprising about 65% to about 85% drying oil and about 35% to about 15% rosin, and about 2%–70% by weight of a polyester prepared by reacting at elevated temperatures dilinoleic acid with pentaerythritol in amounts such that initially the hydroxyl groups in said pentaerythritol are present in slight excess over the carboxyl groups in said acid, said reaction being terminated at an acid number between about 65–90.

6. The composition according to claim 5 wherein said cement contains about 15% by weight of said polyester.

7. The composition according to claim 5 wherein said reaction is carried out at a temperature in the range of about 160°–185° C.

8. A linoleum composition comprising 55%–80% by weight fillers and pigments and 45%–20% by weight linoleum cement, said linoleum cement comprising an oleoresinous siccative oil-resin gel comprising about 65% to about 85% drying oil and about 35% to about 15% rosin, and about 2%–70% by weight of a polyester obtained by reacting at elevated temperatures dilinoleic acid with pentaerythritol in the ratio of about 2 moles of said acid with about 1.1 moles of said pentaerythritol, said reaction being terminated at an acid number between about 65–90, said polyester being subsequently converted to a gel, admixed with said fillers and pigments, and cured at a temperature in the range of about 170°–210° F.

9. The method of preparing a linoleum composition which comprises reacting at a temperature in the range of about 165°–185° C. dilinoleic acid with pentaerythritol in amounts such that initially the hydroxyl groups in said pentaerythritol are present in slight excess over the carboxyl groups in said acid, maintaining said temperatures until the acid number of the product falls to between about 65–90, converting the resulting polyester to a gel, admixing said gel with 55%–80% by total weight of fillers and pigments to form a linoleum composition, forming said composition into a sheet on a backing, and curing said sheet at a temperature in the range of about 170°–210° F.

10. The method of forming a linoleum composition containing an oleoresinous cement comprising about 65% to about 85% drying oil and about 35% to about 15% rosin and 55%–80% by weight fillers and pigments which comprises substituting said oleoresinous cement with about 2%–70% by weight of a polyester obtained by reacting at elevated temperatures dilinoleic acid with pentaerythritol in amounts such that initially the hydroxyl groups in said pentaerythritol are present in slight excess over the carboxyl groups in said acid, said reaction being terminated at an acid number between about 65–90.

11. The method according to claim 10 wherein said reaction is carried out at a temperature in the range of about 165%–185% C.

12. The method according to claim 10 wherein said polyester is substituted for said oleoresinous cement to the extent of about 15% by total weight of cement.

References Cited in the file of this patent
UNITED STATES PATENTS

| | | |
|---|---|---|
| 1,079,728 | Schwarting | Nov. 25, 1913 |
| 2,384,443 | Cowan et al. | Sept. 11, 1945 |
| 2,421,842 | Martin | June 10, 1947 |
| 2,539,491 | Smith | Jan. 30, 1951 |
| 2,629,668 | Fiscella | Feb. 24, 1953 |
| 2,663,649 | Winkler | Dec. 22, 1953 |

FOREIGN PATENTS

| | | |
|---|---|---|
| 428,864 | Great Britain | May 15, 1935 |

UNITED STATES PATENT OFFICE

CERTIFICATE OF CORRECTION

Patent No. 2,873,201                                        February 10, 1959

Lawrence H. Dunlap et al.

It is hereby certified that error appears in the printed specification of the above numbered patent requiring correction and that the said Letters Patent should read as corrected below.

Column 1, line 49, for "anl" read -- and --; column 3, line 18, for "preferably" read -- preferable --; line 73, for "know" read -- known --; column 6, line 7, before "pentaerythritol" insert -- said --; line 15, for "160°-185° F." read -- 160°-185° C. --; line 25, for "80%-20%" read -- 98%-20% --; line 57, for "165°-185° C. read -- 165°-180° C. --; line 61, for "temperatures" read -- temperature --; column 7, line 7, for "165%-185% C." read -- 165°-185° C. --.

Signed and sealed this 2nd day of June 1959.

(SEAL)

Attest:

KARL H. AXLINE
Attesting Officer

ROBERT C. WATSON
Commissioner of Patents